US012671286B2

(12) United States Patent
Niesen et al.

(10) Patent No.: US 12,671,286 B2
(45) Date of Patent: Jun. 30, 2026

(54) ROTOR FOR AN ELECTRIC MACHINE

(71) Applicant: Schaeffler Technologies AG & Co. KG, Herzogenaurach (DE)

(72) Inventors: Thomas Niesen, Karlsruhe (DE); Julian Umlandt, Bischweier (DE); Felix Scheumann, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 169 days.

(21) Appl. No.: 18/684,314

(22) PCT Filed: Aug. 12, 2022

(86) PCT No.: PCT/DE2022/100593
§ 371 (c)(1),
(2) Date: Feb. 16, 2024

(87) PCT Pub. No.: WO2023/036358
PCT Pub. Date: Mar. 16, 2023

(65) Prior Publication Data
US 2025/0149943 A1 May 8, 2025

(30) Foreign Application Priority Data

Sep. 9, 2021 (DE) .......................... 102021123310.0

(51) Int. Cl.
*H02K 1/30* (2006.01)
*H02K 7/04* (2006.01)

(52) U.S. Cl.
CPC ................. *H02K 1/30* (2013.01); *H02K 7/04* (2013.01)

(58) Field of Classification Search
CPC .................................. H02K 1/30; H02K 7/04
USPC ............................................. 310/156.22, 422
See application file for complete search history.

(56) References Cited

U.S. PATENT DOCUMENTS 1,467,938 A * 9/1923 Janette ..................... H02K 1/28
29/598
1,601,122 A 9/1926 Janette

FOREIGN PATENT DOCUMENTS

| CN | 200980011 Y | 11/2007 |
|---|---|---|
| CN | 201789349 U | 4/2011 |
| CN | 103620917 A | 3/2014 |
| CN | 205105014 U * | 3/2016 |
| JP | H0771430 B2 | 8/1995 |

OTHER PUBLICATIONS

Slass, Craig, "on lock down" Retaining Rings, Motion System Design Magazine, 4 pages, Penton Medias Inc., 2004.
DIN 471, 24 pages, Apr. 2011.

* cited by examiner

*Primary Examiner* — Jose A Gonzalez Quinones
(74) *Attorney, Agent, or Firm* — Volpe Koenig

(57) ABSTRACT

A rotor for an electric machine, including a rotor shaft (1) on which an axial stop is provided, which is formed by a securing ring (3) received in a slot (4) in the shaft, and a rotor body (6) pushed onto the rotor shaft (1) and supported axially on the stop. The securing ring (3) is received in a recess (10) in the rotor body (6) and is radially surrounded by the latter.

15 Claims, 3 Drawing Sheets

ROTOR FOR AN ELECTRIC MACHINE

CROSS-REFERENCE TO RELATED APPLICATIONS

This application is the U.S. National Phase of PCT Appln. No. PCT/DE2022/100593, filed Aug. 12, 2022, which claims priority to German Patent Application No. 10 2021 123 310.0, filed Sep. 9, 2021, the entire disclosures of which are incorporated by reference herein.

TECHNICAL FIELD

The disclosure relates to a rotor for an electric machine, comprising a rotor shaft on which an axial stop is provided, which is formed by means of a securing ring received in a slot in the shaft, and a rotor body pushed onto the shaft and supported axially on the stop.

BACKGROUND

Such a rotor, which is usually arranged inside the stator, has a rotor shaft via which the rotor is rotatably mounted and which is also used as a support for the actual rotor body. This rotor body is pushed onto the shaft and secured axially on both sides. The shaft usually has an external toothing that extends axially along the shaft and into which an internal toothing of the rotor body engages. The rotor body itself is usually made up of several parts and consists of a plurality of disc-shaped components, for example in the form of laminated cores or the like formed from individual sheet metal layers, wherein the type of rotor body ultimately depends on the type of rotor.

As described, it is necessary to fix the rotor body axially on the rotor shaft. For this purpose, it is known to form an axial stop on the rotor shaft, for which purpose an output shaft with a correspondingly large diameter is used, which is machined accordingly to form the axial stop. The diameter of the shaft is reduced by machining so that an axial stop is created. This is very complex, as it involves a longer-lasting machining process that requires the appropriate use of machines, and of course a correspondingly dimensioned shaft is also required, but only in order to remove a corresponding amount of material.

In addition to this type of design of the stop, it is known, for example from CN 200980011 Y, to also design such an axial stop using a securing ring attached to the rotor shaft. The rotor shaft, which is inherently designed for the actual target diameter, is provided with a radially open circumferential slot into which the securing ring is inserted. During assembly, the rotor body is then pushed against this securing ring and axially fixed on the opposite side which, according to CN 200980011 Y, is done by another securing ring.

Although it is possible to form a stop on a rotor shaft in this way without extensive machining, the problem arises, particularly in electric machines that are operated at high rotor speeds, that the securing ring is exposed to corresponding centrifugal forces and can expand, meaning that its seat loosens, with the risk of disengagement from the shaft groove.

SUMMARY

The disclosure is based on the problem of specifying an improved rotor that can also be used at very high speeds.

To solve this problem, in a rotor of the type mentioned at the outset, it is provided according to the disclosure that the securing ring is received in a recess in the rotor body and is surrounded radially thereby.

According to the disclosure, the rotor body is not only supported axially on the securing ring, but also serves as a radial securing means, which prevents the securing ring from expanding in an impermissible manner. To make this possible, a corresponding recess is formed on the rotor body, which is provided directly on the inner circumference in the area of the end face of the rotor body and is designed in a quasi ring-fold manner. When the rotor body is pushed on, the securing ring, which is an open or slotted snap ring, runs into this pocket-like recess, on the axial surface of which the securing ring rests, and the radial lateral surface of which surrounds the securing ring radially. This radial grip can now advantageously prevent the securing ring from expanding to an unacceptable extent, as the lateral surface of the recess against which the centrifugally loaded securing ring presses or on which it is supported prevents this. This means that on the one hand the stop can be formed in a simple manner via the securing ring, but on the other hand it can also be secured radially in an equally simple manner.

The inner diameter of the rotor body-side recess is preferably dimensioned such that in the area of the radial overlap of the securing ring there is a radial gap between the rotor body and the securing ring or the lateral surface of the recess and the securing ring. This means that the inner diameter of the recess is slightly larger than the outer diameter of the securing ring. This allows for easy assembly because the rotor body can be easily pushed over the securing ring and there is only an axial stop. Since very precise centering is provided via the rotor shaft, on which both the securing ring and the rotor body are arranged or guided, a very narrow radial gap can be formed between the securing ring and the lateral surface. Of course, it is conceivable, as an alternative to forming a gap, to also implement a type of press fit, which means that the inner diameter of the recess ultimately corresponds to the outer diameter of the securing ring, so that the securing ring is radially supported directly on the lateral surface of the recess in the assembly position.

If a gap is provided, then, viewed radially, the minimum height of the gap is preferably smaller than the depth of the slot in which the securing ring is received. In order for the securing ring to be able to detach from the shaft, it would have to expand to such an extent that it leaves the slot, which means that its inner diameter increases by at least the slot depth. The gap between the lateral surface of the recess and the securing ring does allow for a small recess. However, if the gap height is designed to be correspondingly small, the degree of expansion is limited. If, according to the disclosure, the height of the gap is designed to be smaller or significantly smaller than the depth of the slot, the securing ring can only widen minimally, but under no circumstances to an extent that would allow it to leave the slot.

The securing ring itself usually has radial widened portions at both ends, at which mounting openings are provided, through which a corresponding assembly tool reaches, via which the securing ring, as is usual with a snap ring, can be expanded during assembly so that it can be stretched over the rotor shaft can be pushed and then snapped into the slot. The minimum gap between the rotor body or the radial lateral surface of the recess and the securing ring is given to these widened portions. It is sufficient to fix the widened ends radially, since the securing ring cannot expand over its remaining length. Alternatively, the snap ring can also have a constant outer diameter, in which case it is mounted using a mounting sleeve. Here the minimum gap would be around the entire circumference of the snap ring and not just locally as described in the above embodiment of the snap ring.

As described, the rotor body surrounds the securing ring radially, which means that there is inevitably a radial overlap. This radial overlap does not have to be provided over the entire width of the securing ring, viewed in the axial direction. Rather, it is sufficient if the rotor body axially engages over the securing ring over at least half the width of the securing ring. Since the securing ring is accommodated in its slot in an axially almost immovable manner, since the slot width is based on the securing ring width and the rotor body is axially clamped against the securing ring, a smaller overlap, viewed axially, is already sufficient to secure the securing ring accordingly.

As described, the rotor body regularly consists of a number of individual disc-shaped elements. Such a disc-shaped element can be a balancing disc which is arranged on the end face of the rotor body and which is axially supported on the securing ring. In such a case, this balancing disc is then provided with the recess. The formation of the recess on the balancing disc is possible without any problems, since the balancing disc is primarily intended for support and compensation purposes, and its thickness is also correspondingly dimensioned so that the corresponding annular recess-shaped recess can be formed on it. The balancing disc therefore has another function, namely that of the radial securing means.

The balancing disc can have an axially projecting, cylindrical annular collar on which the recess is provided. This annular collar is the actual support collar with which the annular disc is axially supported on the securing ring. The outer diameter of this cylindrical, annular collar is correspondingly larger than the outer diameter of the securing ring, so that the annular recess-shaped recess can easily be incorporated into the end face of the annular collar.

The rotor body itself is of course also secured accordingly on the sides opposite the securing ring stop. This securing can be done using a caulking sleeve. During assembly, the pushed-on rotor body is pressed axially against the securing ring, after which the pushed-on caulking sleeve is caulked radially against the rotor shaft and is thereby axially fixed in position. As an alternative to such a caulking sleeve, it is also conceivable to axially clamp and secure the rotor body using a shaft nut with an associated securing plate.

In addition to the rotor itself, the disclosure also relates to an electric machine comprising, of course in addition to a stator, a rotor of the type described above.

BRIEF DESCRIPTION OF THE DRAWINGS

The disclosure is explained below on the basis of exemplary embodiments with reference to the drawings. The drawings are schematic representations, in which.

DETAILED DESCRIPTION

Figure 1:
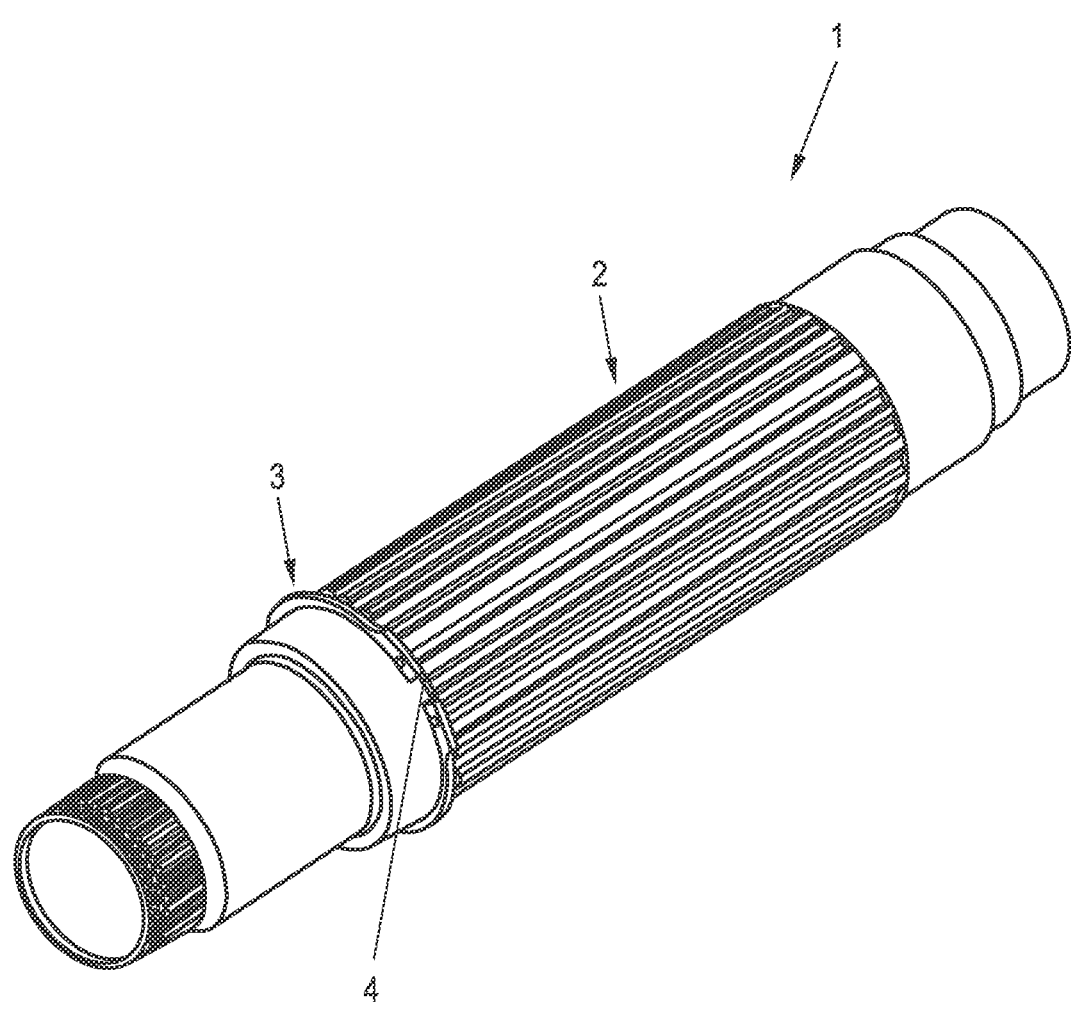
FIG. 1 shows a perspective view of a rotor shaft of a rotor according to the disclosure.

FIG. 1 shows a rotor shaft 1, which is part of a rotor according to the disclosure. On the rotor shaft 1 there is an external toothing 2 which extends in the axial direction and fixes a rotor body, described in more detail below, which is to be arranged on the rotor shaft 1 in a rotationally fixed manner and in an axially secured manner in both directions.

To secure in one axial direction, a securing ring 3 is provided in the form of a snap ring, which engages in a slot 4 which is formed on the outer circumference of the rotor shaft 1. This securing ring 3 serves as an axial stop for the rotor body to be pushed axially onto the rotor shaft 1, which is supported against the securing ring 3.

Figure 2:
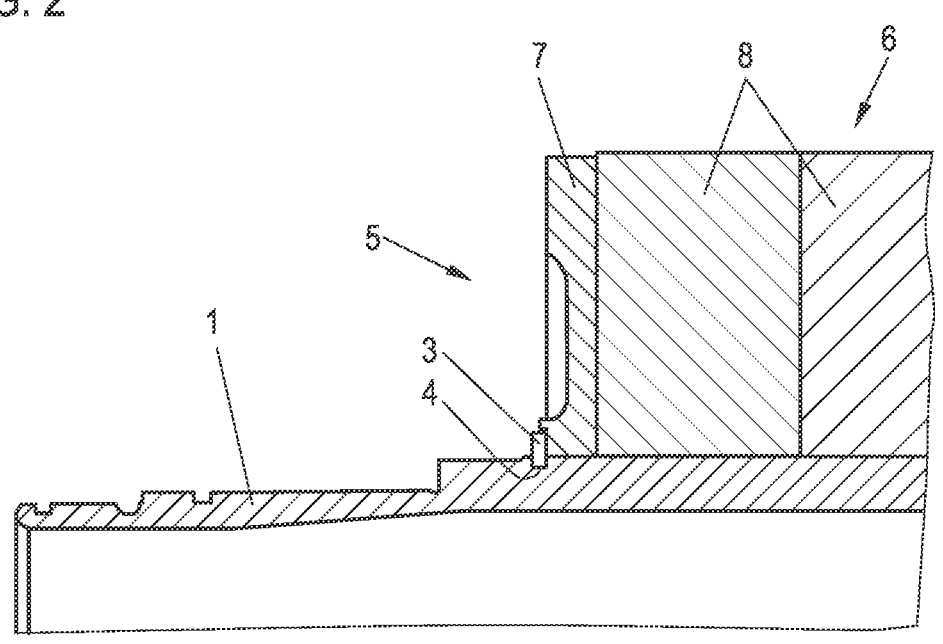
FIG. 2 shows a partial view of a rotor according to the disclosure in longitudinal section.

An enlarged partial view of this area is shown in FIG. 2, which shows a section of a rotor 5 according to the disclosure, which the rotor shaft 1 is part of. As described, the circumferential annular slot 4 is formed on the rotor shaft 1, into which the securing ring 3 is inserted as an axial stop. Also shown is the rotor body 6, of which a balancing disc 7 is shown in the example, which is arranged axially leading and which runs against the securing ring 3 when pushed onto the rotor shaft 1, as well as multiple rotor segments 8, which are, for example, laminated cores, wherein the rotor body can of course also be made up of other elements, depending on the type of rotor.

In any case, the multi-part rotor body 6 is axially tensioned against the securing ring 3 and supported there. On the other hand, it is secured, for example, via a caulking sleeve, which rests axially on a further balancing disc provided there and which is caulked against the rotor shaft 1.

Figure 3:
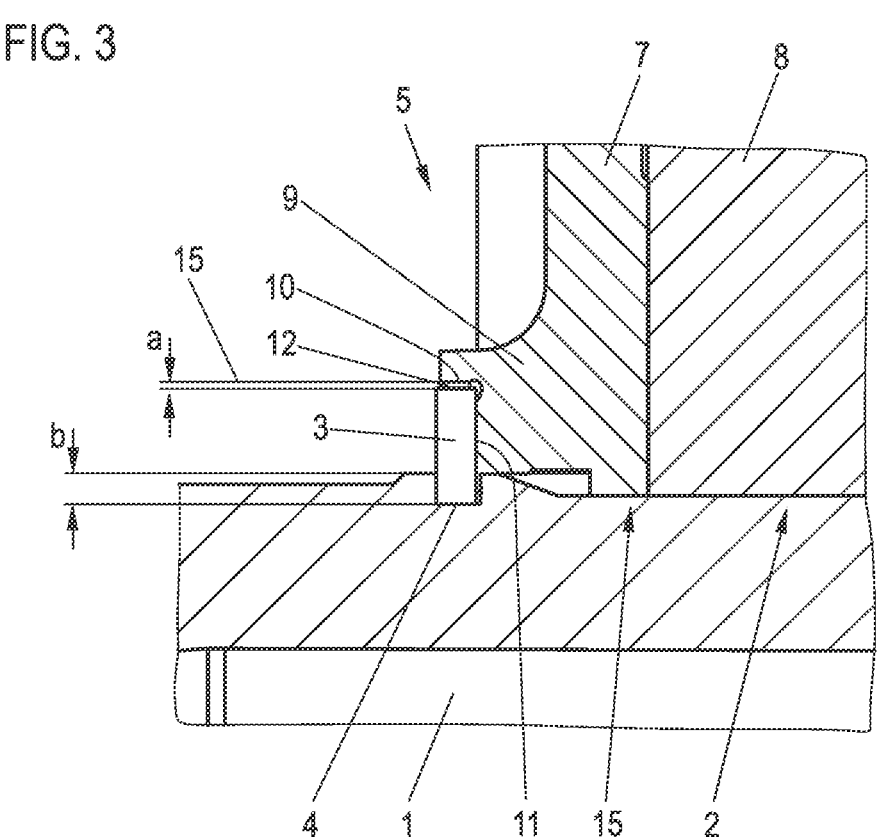
FIG. 3 shows an enlarged partial view of the rotor from FIG. 2 showing the stop formed by the securing ring and the balancing disc attached thereto.
Figure 4:
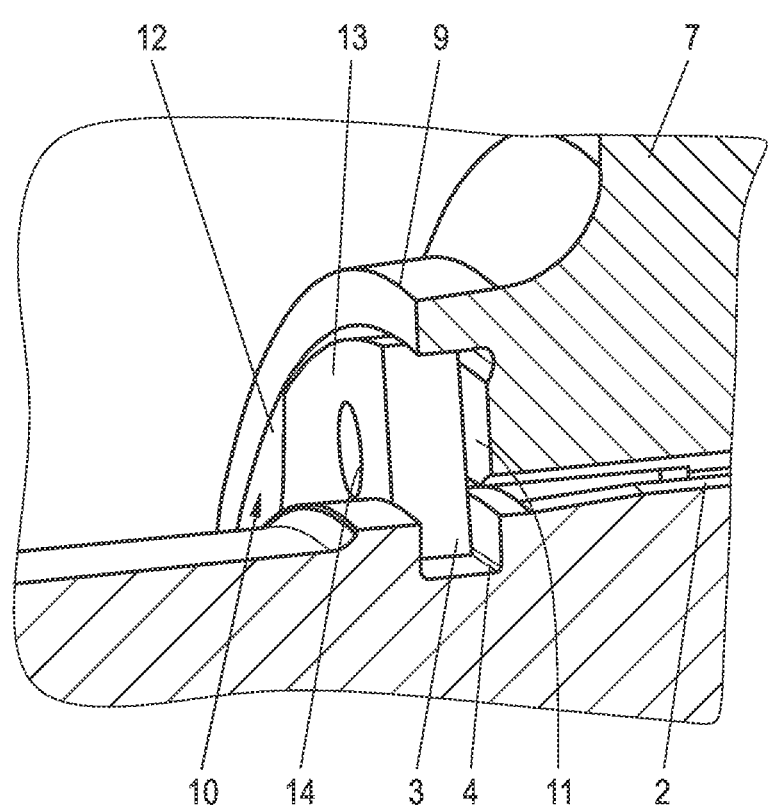
FIG. 4 shows a perspective view of the arrangement shown in FIG. 3.

FIGS. 3 and 4 show enlarged partial views of the rotor 5 from FIG. 2 in the area of the securing ring 3. A section of the balancing disc 7 is shown, which has an axially projecting, cylindrical annular collar 9, on which a recess 10 is formed, which is open towards the end face and is designed as a kind of pocket. It is limited in the axial direction, on the one hand, by the axial recess surface 11 and, on the other hand, radially by the cylindrical lateral surface 12. As FIG. 3 shows, the recess 10 is designed such that it is able to accommodate the securing ring 3. The securing ring 3 rests axially on the recess surface 11. The radial lateral surface 12, on the other hand, surrounds the securing ring 3 radially, which means that the annular collar 9 extends axially over the securing ring 3 and virtually encloses it.

FIG. 4 shows, in the form of a schematic representation, the rotor part according to FIG. 3 in a perspective view. From this, it can be seen that the slotted securing ring 3 has two radially extending extensions 13 at its two ends, on which corresponding mounting openings 14 are provided, which are passed through by a tool to expand the ring when the securing ring 3 is mounted. The securing ring 3 is of course also overlapped in the area of these widened portions 13, wherein a gap 15 is formed between the lateral surface 12 and the outside of the respective widened portions 13, which has a gap height a, as shown in FIG. 3. This gap height is significantly smaller than the depth b of the slot 4, as is also shown in FIG. 3. On the one hand, this makes it easy to assemble the rotor body, since the balancing disc 7 can be easily pushed over the securing ring 3, since both only touch each other axially, but not radially. At the same time, the very narrow dimension of the gap 15 ensures that the securing ring 3 can only expand minimally due to centrifugal force. When it expands, the widened portions 13 run against the lateral surface 12, so further expansion is no longer possible. Since the gap height a is much smaller than the slot depth b, this ensures that the securing ring 3 can under no circumstances expand to such an extent that it unintentionally leaves the slot 4.

The ring collar 9 does not necessarily engage over the securing ring 3 over its entire width. It is already sufficient if it only overlaps it by approximately half, for example, since the securing ring 3 in the slot 4 is pressed axially against the slot flank via the rotor body 6 and consequently there is no axial play.

FIGS. 3 and 4 also show, in addition to the external toothing 2, a corresponding internal toothing 15 on the rotor body 6, i.e., on the balancing disc 7 and on the individual rotor segments 8, which engage in the external toothing 2 of the rotor shaft 1, so that on the one hand there is precise axial guidance during assembly, which enables precise centering and positioning, and on the other hand there is also a rotationally fixed connection between the rotor body 6 and the rotor shaft 1.

The design according to the disclosure using the securing ring 3, which forms the axial stop, enables, on the one hand, the use of a rotor shaft 1 with a base diameter corresponding to the target diameter, since machining is no longer required to form the axial stop, except for the formation of the annular slot 4. This means that the formation of the stop is very simple. In addition, the radial securing of the securing ring 3 via the radial grip on the part of the rotor body 6 or here the balancing disc 7 also allows the rotor to be used at very high speeds, as the radial expansion of the securing ring due to centrifugal force is limited and it is impossible for the securing ring 3 to jump out of the slot 4.

As described, the rotor body 6 can be constructed in any way. In the exemplary embodiment shown, a balancing disc 7 is provided on the side where the securing ring 3 is arranged. Of course, the rotor body 6 can also be configured differently, i.e., without a balancing disc 7. In any case, however, the rotor body element positioned adjacent to the securing ring 3 has a corresponding recess 10, which receives the securing ring 3 in the manner described above and surrounds it radially.

LIST OF REFERENCE SYMBOLS

1 Rotor shaft
2 Outer toothing
3 Securing ring
4 Slot
5 Rotor
6 Rotor body
7 Balancing disc
8 Rotor segment
9 Annular collar
10 Recess
11 Recess surface
12 Lateral surface
13 Widened portion
14 Mounting opening
15 Gap
a Gap height
b Slot depth

The invention claimed is:

1. A rotor for an electric machine, comprising:
a rotor shaft on which an axial stop is provided, which is formed by a securing ring received in a slot in the rotor shaft;
a rotor body pushed onto the rotor shaft and supported axially on the stop; and
a recess in the rotor body in which the securing ring is received, and the securing ring is radially surrounded by the rotor body;

wherein the rotor body is radially spaced from the securing ring via a gap in an area of radial overlap, and viewed radially, a minimum height of the gap is smaller than a depth of the slot in which the securing ring is received, such that the securing ring is minimally expandable into the gap.

2. The rotor according to claim 1, wherein the securing ring has radial widened portions at two ends thereof, on which mounting openings are provided, wherein a minimum height of the gap is given between the widened portions and the rotor body.

3. The rotor according to claim 1, wherein the rotor body axially engages over the securing ring over at least half of a width of the securing ring.

4. The rotor according to claim 1, wherein the rotor body comprises a balancing disc via which the rotor body is supported on the securing ring, and the recess is in the balancing disc.

5. The rotor according to claim 4, wherein the balancing disc has an axially projecting, cylindrical annular collar on which the recess is provided.

6. The rotor according to claim 1, wherein the rotor body is axially secured on a side opposite the securing ring by a caulking sleeve or a shaft nut.

7. An electric machine, comprising the rotor according to claim 1.

8. A rotor for an electric machine, comprising:
a rotor shaft having a circumferential slot therein, wherein the rotor shaft has a radially increased thickness in an area of the circumferential slot compared to a radial thickness of the rotor shaft adjacent the radially increased thickness in the area of the circumferential slot;
a securing ring received in the circumferential slot in the rotor shaft;
a rotor body pushed onto the rotor shaft and supported axially on the securing ring;
and a recess in the rotor body defining a wall that at least partially radially surrounds the securing ring.

9. The rotor according to claim 8, wherein the rotor body is radially spaced from the securing ring via a gap in an area of radial overlap.

10. The rotor according to claim 9, wherein, viewed radially, a minimum height of the gap is smaller than a depth of the slot in which the securing ring is received.

11. The rotor according to claim 10, wherein the securing ring has radial widened portions at two ends thereof, on which mounting openings are provided, wherein a minimum height of the gap is given between the widened portions and the rotor body.

12. The rotor according to claim 8, wherein the rotor body includes a recess surface that axially contacts the securing ring, and a radially inner surface of the recess extends over at least half of a width of the securing ring.

13. The rotor according to claim 8, wherein the rotor body comprises a balancing disc via which the rotor body is supported on the securing ring, and the recess is in the balancing disc.

14. The rotor according to claim 13, wherein the balancing disc has an axially projecting, cylindrical annular collar on which the recess is provided.

15. The rotor according to claim 8, wherein the rotor body is axially secured to the rotor shaft on a side opposite the securing ring.

* * * * *